Figure 1:
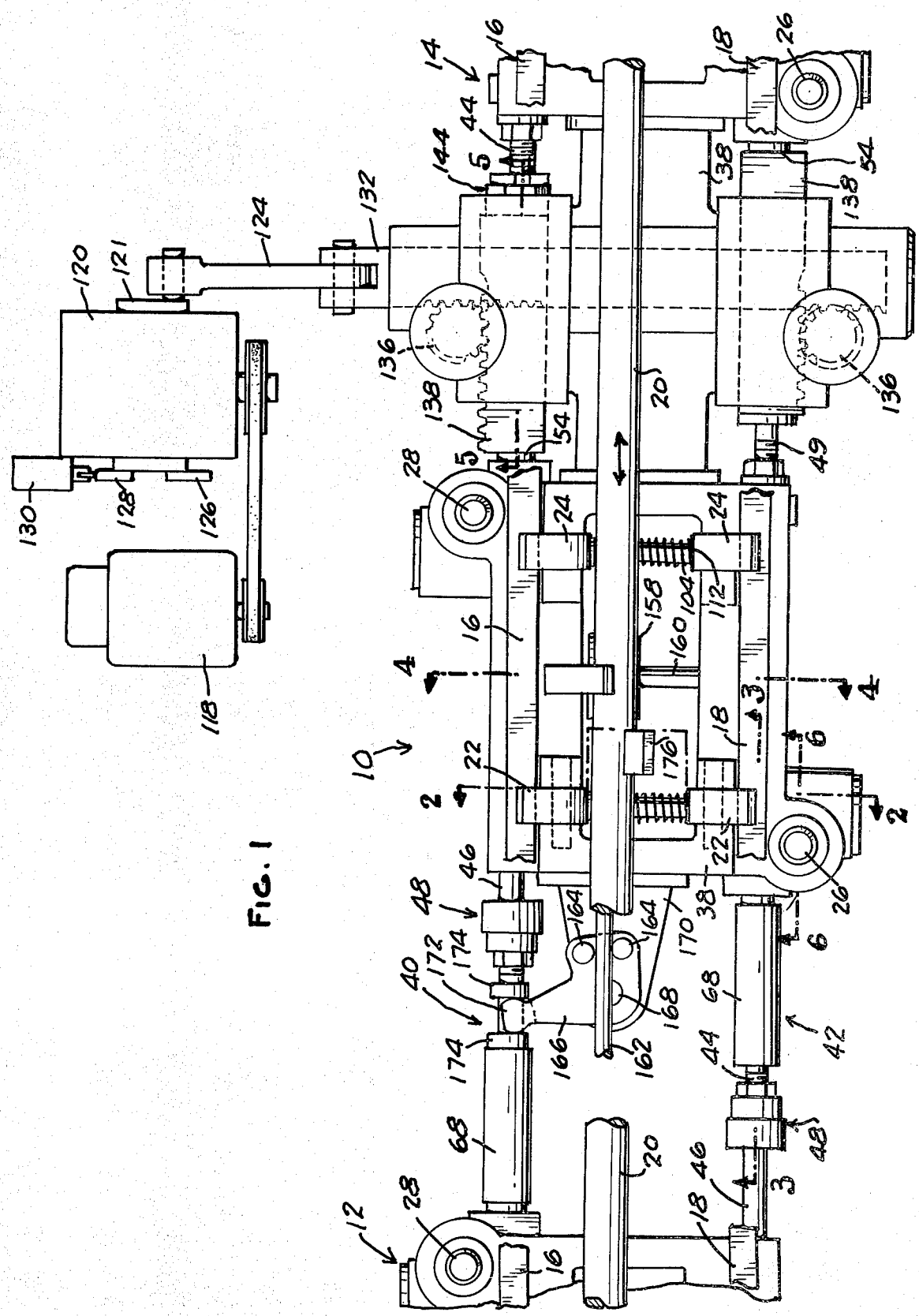

United States Patent [19]

Stalker

[11] 3,968,869

[45] July 13, 1976

[54] PALLET LOCATING AND CLAMPING ARRANGEMENT

[75] Inventor: Neil J. Stalker, Clarkston, Mich.

[73] Assignee: F. Jos. Lamb Company, Warren, Mich.

[22] Filed: July 14, 1975

[21] Appl. No.: 595,508

[52] U.S. Cl. ............................... 198/19; 108/143; 214/1 B; 267/56
[51] Int. Cl.² ......................................... B23Q 5/22
[58] Field of Search ............... 198/19, 34; 108/143; 214/1 B, 1 BB; 267/56

[56] References Cited
UNITED STATES PATENTS
2,249,230  7/1941  Schafer .............................. 198/19

*Primary Examiner*—Richard A. Schacher
*Assistant Examiner*—Douglas D. Watts
*Attorney, Agent, or Firm*—Barnes, Kisselle, Raisch & Choate

[57] ABSTRACT

A work piece transfer mechanism having a plurality of successive stations each provided with a fixture for locating and clamping a pallet in position for performing a machining operation on the work piece supported by the pallet. The locating and clamping means of each fixture are actuated by reciprocating bars. Preloaded compression springs are interposed between the bars and the locating and clamping means of each fixture for applying a relatively high force to the clamping members in response to a short stroke of the bars.

25 Claims, 8 Drawing Figures

PALLET LOCATING AND CLAMPING ARRANGEMENT

This invention relates to a pallet locating and clamping fixture for a work piece transfer mechanism.

In machining numerous types of work pieces it is common practice to mount the work piece on a pallet and index the pallet supported work pieces on rails to successive machining stations. With such arrangements it is usually necessary to employ at each station a fixture for accurately locating and firmly clamping the pallet in a precise location. The locating means usually comprise at least two simultaneously shiftable pins which are adapted to be projected into locating bores in the pallet. The clamping means usually comprise two pairs of clamps adapted to engage feet on the pallet and clamp the pallet firmly against the rails.

The means for operating the locating and clamp devices sometimes utilize hydraulic cylinders at each station for actuating the locating pins and the clamps. Such an arrangement is costly and requires means for assuring simultaneous operation of all the clamps and pins at numerous stations.

It has also been the practice heretofore to actuate the locating and clamping devices by utilizing a rotatable bar which extends lengthwise of the sucessive stations, the bar being provided with gears, cams etc., for operating the locating pins and clamps. If the clamping pressure is exerted through the rotatable bar itself, then the torsion which builds up along the bar from one end to the other results in a non-uniform clamping action. On the other hand, if the rotatable bar is utilized merely to release spring biased clamps, then the clamping pressure is determined by the tension in each of the springs. This arranement also poses practical problems in the way of cost and uniformity of action.

Another factor of considerable importance in connection with the design of locating and clamping mechanisms for pallets is that the space between successive stations of the transfer line is sometimes very limited. Consequently, if each station includes two sets of locating pins and two pairs of clamps and the clamp actuating mechanism is disposed between successive stations, the actuating mechanism, must be relatively compact.

The present invention has for its primary object the provision of a pallet locating and clamping fixture wherein the actuating means therefor comprise a bar which extends lengthwise of the stations and is reciprocated axially to actuate the locating pins and clamps.

Another object of the invention resides in a pallet locating and clamping mechanism which includes a bar extending lengthwise of the machine and adapted to actuate the pins and clamps to their operative position through compression springs which are operatively connected between the bar and the locating pins and clamps.

A further object of the invention resides in the utilization of preloaded compression springs which are further compressed by a relatively short stroke of a bar extending lengthwise of the stations to exert a relatively high clamping pressure against the pallets.

More specifically, the present invention comprises a pair of bars extending lengthwise along opposite sides of the successive stations of a work piece transfer machine. The two bars are adapted to be shifted axially simultaneously in opposite directions. One of the bars controls the operation of one locating pin and one pair of clamps at each station and the other bar controls the operation of another locating pin and another pair of clamps at each station. At each station each bar is operatively connected to the means for actuating the pins and clamps by means of a preloaded compression spring which when the bar is initially moved in the clamping direction actuates the clamps to engage the pallet and upon further movement of the bar, the compression spring is further compressed and applies a relatively high force to the clamps to insure firmly clamping the pallets on the transfer rails.

Other features and advantages of the present invention will become apparent from the following description and drawings in which:

FIG. 1 is a fragmentary plan view of a work piece transfer machine embodying the present invention and showing one station thereof and portions of the next adjacent stations.

Figure 2:
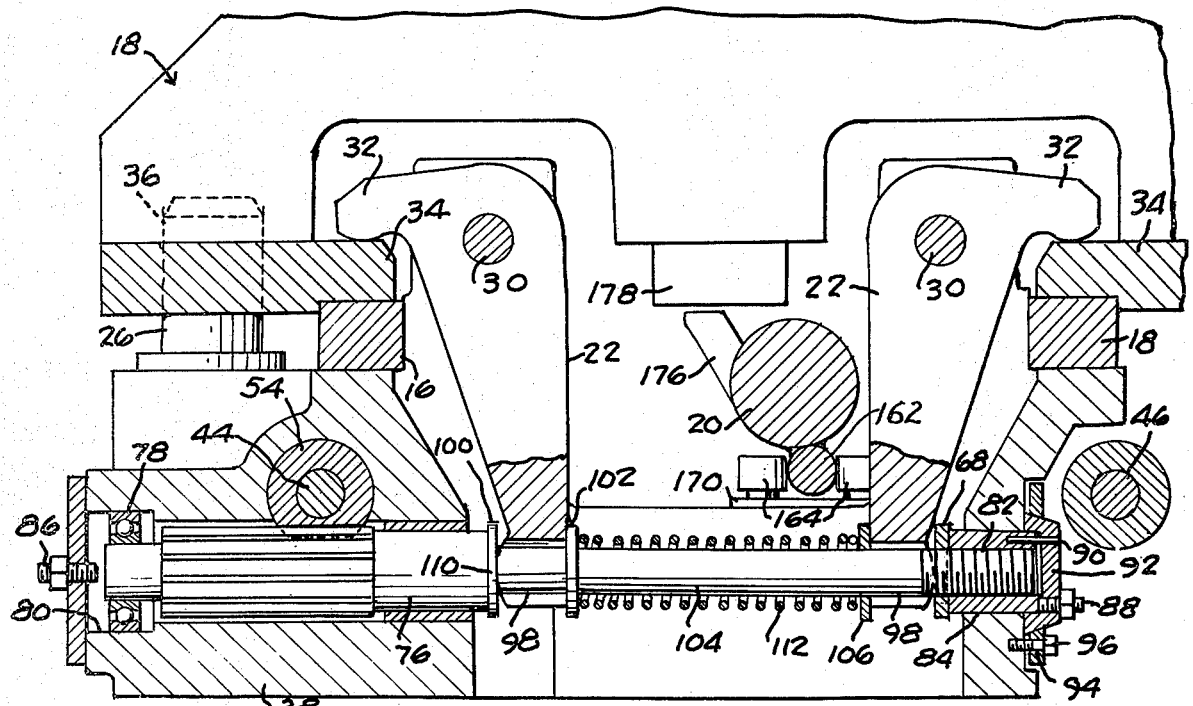
Figure 3:
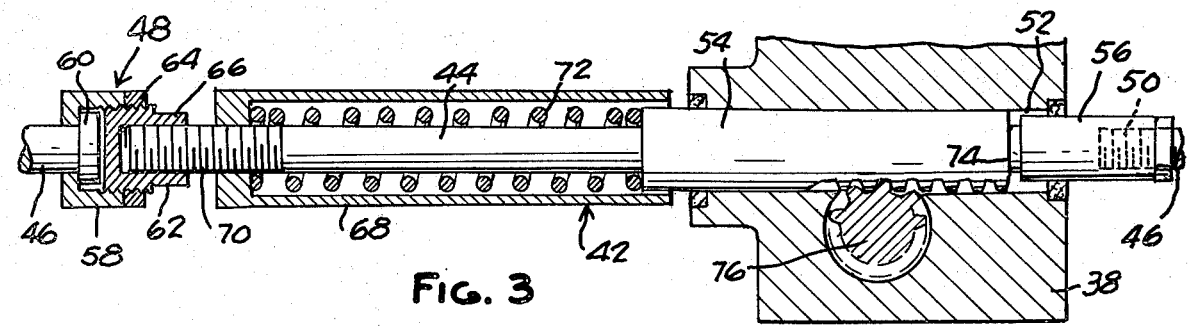
Figure 4:
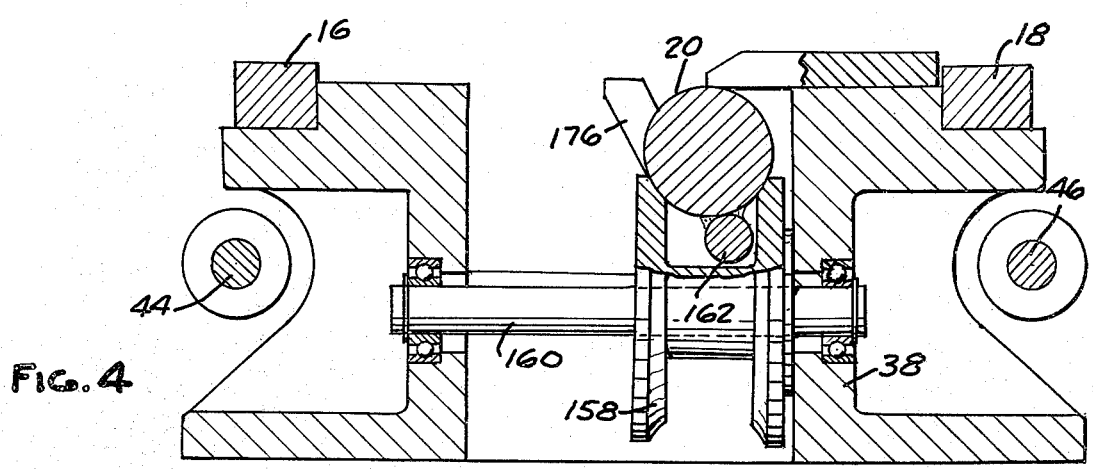
Figure 5:
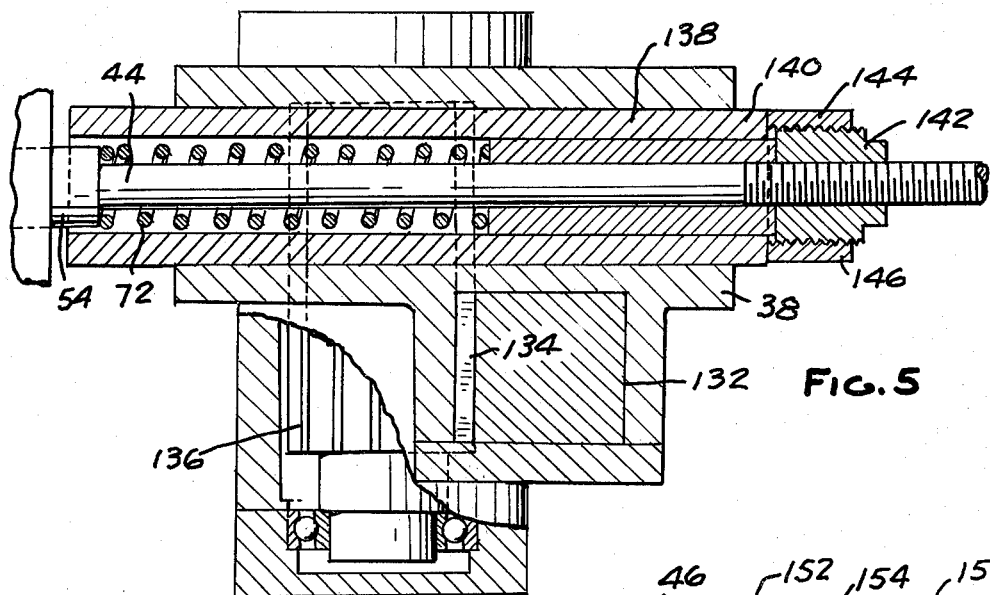
Figure 8:
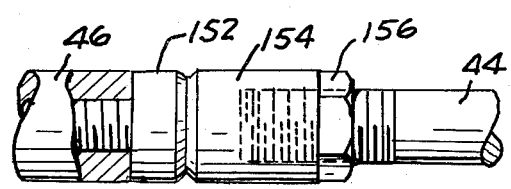
Figure 6:
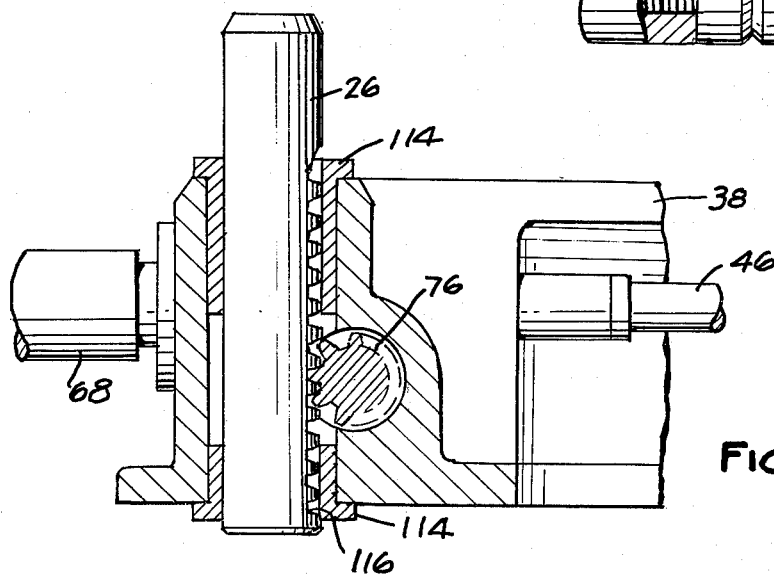
Figure 7:
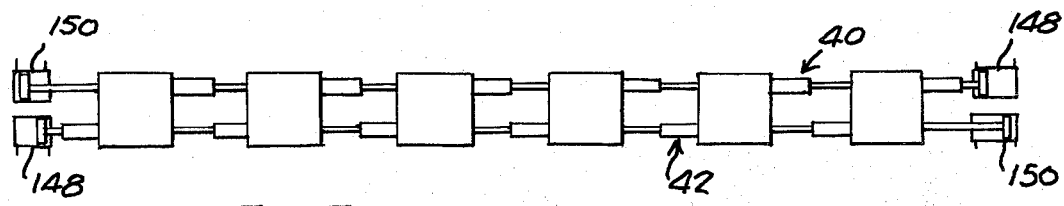

FIG. 2 is a sectional view along line 2—2 of FIG. 1.
FIG. 3 is a sectional view along line 3—3 of FIG. 1.
FIG. 4 is a sectional view along line 4—4 of FIG. 1.
FIG. 5 is a sectional view along line 5—5 of FIG. 1.
FIG. 6 is a sectional view along line 6—6 of FIG. 1.
FIG. 7 is a generally schematic view showing another form of drive arrangement for the locating and clamping mechanism according to the present invention.
FIG. 8 is a fragmentary view showing the manner in which the successive bar sections may be coupled at their adjacent ends when the mechanism is driven with the arrangement shown in FIG. 7.

In FIG. 1 there is illustrated one station generally designated 10 of a work piece transfer machine which in many respects is of conventional construction. The station to the left of station 10 is designated 12 and the station to the right of station 10 is designated 14. Except as hereinafter noted stations 10, 12, 14 are of similar construction. The transfer mechanism includes a pair of rails 16, 18 which extend continuously along the successive stations and on which pallets 18 (FIG. 2) are slidably arranged. A transfer bar 20 also extends lengthwise through the successive stations of the machine.

In the machine illustrated the locating and clamping fixture at each station includes two pairs of clamps 22, 24 and two pallet locating pins 26, 28. As shown in FIG. 2, clamps 22, 24 are pivotally supported as at 30 for pivotal movement about horizontal axes. In the clamped position, the upper ends 32 of the clamps are adapted to bear downwardly against feet 34 on pallets 18 and thus clamp the pallets against the rails 16, 18. Each pallet is formed with a pair of vertically extending bores 36 into which the locating pins 26, 28 are adapted to be projected vertically upwardly to accurately locate the pallet at each station. At each of the stations the above described mechanism is mounted on a fixture base 38. The arrangement thus far described is generally conventional.

In accordance with the present invention clamps 22, 24 and locating pins 26, 28 are actuated by two composite bars 40, 42 which are spaced apart transversely and extend lengthwise through the successive stations. Each bar consists of a plurality of spring bars 44 and slave bars 46 interconnected by couplings 48 at one set of adjacent ends thereof and by threaded connections 50 (FIG. 3) at the other set of adjacent ends. In the arrangement, illustrated, bar 40 is adapted to actuate clamps 24 and locating pin 28 and bar 42 is adapted to actuate clamps 22 and locating pin 26. Bars 40, 42 are simultaneously reciprocated lengthwise in opposite directions as described more fully hereinafter.

FIGS. 2 and 3 illustrate the manner in which the reciprocation of bars 40, 42 are adapted to actuate the locating pins and clamps. As is apparent from the location of the sections represented in FIGS. 2 and 3, the mechanism shown in these figures relates to the actuation of clamps 22 and locating pin 26 by bar 42. However, an identical mechanism is employed in connection with the actuation of clamps 24 and locating pin 28 by bar 40. As shown in FIG. 3, each spring bar 44 extends through the base 38 at each station. More specifically, at ecah station base 38 is formed with a bore 52 in which a tubular gear rack 54 is slidably arranged. Spring bar 44 is in turn slidably arranged within gear rack 54. At one end thereof bar 44 is enlarged as at 56 to form an abutment for the adjacent end of rack 54. Slave bar 46 is threaded into the enlarged end 56 of bar 44. As previously indicated, the other end of bar 44 is connected to the adjacent end of slave bar 46 by coupling 48. This coupling consists of a cap 58 which engages an enlarged shoulder 60 on the adjacent end of bar 46. Cap 58 is in threaded engagement with a plug 62 which is in turn threaded on the adjacent end of bar 44. Cap 58 and plug 62 are locked together by a nut 64 and the adjusted position of plug 62 on shaft 44 is maintained by a lock nut 66.

A sleeve 68 closed at one end and open at the other is threaded on the threaded portion 70 of bar 44. Within sleeve 68 and surrounding bar 44 there is arranged a compression spring 72. One end of compression spring 72 bears against the closed end of sleeve 68 and the other end of spring 72 bears against the adjacent end of tubular rack 54. FIGS. 2 and 3 illustrate the mechanism in the clamped position obtained by shifting bar 42 to the right. In the released position of clamps 22 and pin 26, bar 44 would be displaced to the left of the position shown in FIG. 3 wherein the end 74 of rack 54 would be in abutting relation with the enlarged end 56 of bar 44. In the latter position, sleeve 68 is adjusted lengthwise on bar 44 to obtain a desired preload in spring 72. For example, sleeve 68 can be adjusted so that in the released position of the clamps and locating pins, spring 72 is under a load of about 3,000 pounds.

It will be noted that tubular rack 54 is in engagement with a pinion shaft 76. Shaft 76 is supported at one end in a bearing 78 slidably arranged in a bore 80. At its opposite end, shaft 76 is supported by a nut 82 which is slidably supported in a bore 84. The longitudinal travel of shaft 76 is restricted at one end by an adjustable stop screw 86 and at its opposite end by an adjustable stop screw 88. Nut 82 is keyed against rotation by a pin 90 in a cap 92. Rotation of cap 92 causes threaded adjustment of nut 82 on shaft 76. Cap 92 has a conically shaped outer periphery, by means of which it is adapted to be locked in position by a retainer 94 secured thereover by a plurality of screws 96.

As shown in FIG. 2 the forked lower end 98 of one clamp 22 is trapped between a pair of washers 100, 102 on the reduced diameter portion 104 of pinion shaft 76. The forked lower end 98 of the other clamp 22 is trapped between a pair of washers 106, 108 on the shaft portion 104. Washer 100 is positioned against a shoulder 110 on pinion shaft 76 and washer 108 is positioned against the inner end of nut 82. Washers 102, 106 are urged away from each other and against ends 98 of clamps 22 by a compression spring 112 which normally urges the two clamps 22 in opposite directions towards their released positions. Compression spring 112 functions as an equalizer spring to insure that the two clamps 22 will be brought to bear with equal pressure or force on the feet 34 of palled 18. This results from the fact that pinion shaft 76 is freely slidable in a lengthwise direction and will centralize itself when clamps 22 are actuated to the clamped position.

Referring now to FIG. 6, it will be observed that location pin 26 is mounted for vertical sliding movement in bushings 114. Pin 26 is formed with a gear rack portion 116 which meshes with the toothed portion of pinion shaft 76. Thus, with the arrangement shown in FIGS. 2, 3, and 6, when bar 44 is shifted to the right to the position shown in FIG. 3, pinion shaft 76 is rotated in a clockwise direction as viewed in FIGS. 3 and 6. This causes locating pin 26 to be shifted vertically upwardly and at the same time causes pinion shaft 76 to be threaded into nut 82 and, thus, shorten the distance between the lower ends 98 of clamps 22. The resulting pivotal movement of clamps 22 brings the ends 32 of the clamps into pressure engagement with the feet 34 of pallet 18. Continued movement of bar 44 after the clamps engage the pallet further compresses spring 72 and causes the enlarged end 56 of bar 44 to move out of engagement with the end 74 of gear rack 54 (FIG. 3). Thus, the full load of spring 72 is applied to gear rack 54 which in turn is transmitted to the clamps through the pinion shaft 76. Thus, depending upon the preload compression of spring 72, a relatively short stroke of bar 44 is capable of producing a relatively high clamping force. When bar 44 is shifted in a direction to the left, rack 54 will reverse its travel, washers 100, 108 will back away from the forked ends of clamps 22, and spring 112 through washers 102, 106 will cause clamps 22 to pivot to the released position.

Stop screws 86, 88 are so set that, when bar 44 is shifted to release the clamps, nut 82 and shaft 76 will retract in opposite directions equal amounts so that the clearance between the ends 32 of the clamps and the feet 34 on the pallet will be the same for both clamps. Preferably this clearance is relatively small, for example, less than 1.100 inches, but sufficient to allow the pallet to move out of a station and permit the next successive pallet to move into the station. The initial adjustment of nut 82 (permitted by rotation of cap 92 when screws 96 are loosened) provides a means for adjusting the clamps at all the stations so that they will engage the pallets simultaneously.

As mentioned previously the reciprocation of bar 40 produces actuation of clamps 24 and locating pins 28 in the same manner as described in connection with bar 42. The use of two bars 40, 42 for operating both pairs of clamps 22, 24 is a practical necessity to obtain simultaneous and uniform operation of all the clamps because of the necessity of employing a compression spring 72 for each pair of clamps in the limited space between successive stations.

In FIG. 1 there is illustrated one form of drive mechanism for reciprocating bars 40, 42 simultaneously in opposite directions. This drive assembly consists of a motor-brake unit 118 which drives a speed reducer 120. The output shaft of speed reducer 120 is provided with a crankshaft 121 at one end which reciprocates a gear rack 122 by means of a link 124. On the opposite end of crankshaft 121 are mounted diametrically opposed cams 126, 128 arranged to contact a switch 130 when rack 122 is at either end of its stroke and thereby stop the drive until it is called upon again to make another half revolution.

Rack 122 is slidably supported in a rectangularly shaped bore 132 as shown in FIG. 5 in base 38 of the fixture at station 10. The toothed portion 134 of rack 122 meshes with a pair of pinions 136. Each pinion 136 in turn meshes with a tubular rack 138 of square cross section. As shown in FIG. 1, the arrangement is such taht the two racks 138 are reciprocated simultaneously in opposite directions. The spring bars 44 at station 10 extend through racks 138 as shown in FIG. 5. In a manner similar to that previously described with respect to FIG. 3, compression springs 72 are retained between the ends of tubular racks 54 and spacers 140. The position of spacer 140, and thus the extent of preload on spring 72, is adjusted by a plug 142 threaded on spring bar 44. A collar 144 is threaded onto plug 142 and abuts rack 138 to locate the drive assembly relative to the spring bar assembly. When these assemblies are properly located relative to one another, the adjustment is locked in position by a nut 146.

It will be apparent that when rack 122 is shifted inwardly towards base 38, bar 42 will be shifted to the right as viewed in FIG. 1 and bar 40 will be shifted to the left so as to actuate both sets of clamps and locating pins to their operative positions.

It will be appreciated that in place of the drive assembly illustrated in FIG. 1, the two bars 40, 42 can be hydraulically powered in the manner illustrated in FIG. 7 for example. In this arrangement two sets of hydraulic cylinders 148, 150 are arranged at the opposite ends of the two bars 40, 42. When a pallet is in position and ready to be clamped, one set of the cylinders is actuated to shift the two bars simultaneously in opposite directions. When the machining operation has been completed and the pallets are ready to be transferred, the other set of hydraulic cylinders are actuated and the two bars are then again shifted axially in opposite directions.

If the bars are pushed to engage the clamps, then the couplings at the adjacent ends of the spring bars 40 and slave bars 46 can take the simple form illustrated in FIG. 8 where a hardened button 152 is secured to the end of slave bar 46, and a hardened cap 154 is adjustably threaded on the end of spring bar 44. After cap 154 is adjusted to the desired length determined by the distance between successive stations, it is locked in place by nut 156.

It will be appreciated that instead of pushing bars 40, 42 to actuate the clamps and locating pins to their operative positions, the hydraulic cylinders at the ends of the bars can be designed to pull the bars. Where the bars are relatively long and relatively small in diameter, pulling of the bars to produce a clamping action is preferred over pushing so as to eliminate the possibility of the bars from bowing when subjected to axial compression. It will be further appreciated that it is unnecessary to utilize hydraulic cylinders at both ends of the bars. A single cylinder at one end of each bar can be used if the cylinder is of the double acting type.

Referring now to FIGS. 1, 2, and 4, it will be observed that transfer bar 20 is supported along its length by rollers 158 secured to a cross shaft 160 supported by bearings in base 38. Preferably at least one support roller 158 is located at each station. Adjacent the station 10 illustrated in FIG. 1, transfer bar 20 has secured to the bottom side thereof a longitudinally extending rod 162 having a length at least slightly longer than the transfer distance between successive stations. Rod 162 forms a track engaged by a pair of rollers 164 mounted on a bellcrank 166 which is pivoted at 168 on a bracket 170. Bellcrank 166 has forked ends 172 arranged between adjusting nuts 174 on bar 40. When bar 40 is moved to unclamp the pallet feet and to retract the locating pins, bellcrank 166 rotates transfer bar so as to revolve the transfer fingers 176 into the path of travel of a dog 178 (FIG. 2) on the bottom side of pallets 18. Thereafter when the transfer bar is advanced in a conventional manner, the pallets will be indexed to the next successive station. When bar 40 is shifted to cause the locating pins to project into the locating holes on the pallets and the clamps to engage the feet of the pallets transfer bar 20 is rotated by bell crank 166 so that fingers 176 revolve to a position bypassing dogs 178 when the transfer bar is retracted. Thus, a mechanical interlock between the pallet locating and clamping fixture and the transfer bar is provided to insure that the transfer bar is at all times in its proper position without the use of limit switches.

I claim:

1. In a work piece transfer machine of the type wherein pallet supported work pieces are conveyed to a plurality of successively spaced apart stations at which operations are performed on the work piece, each said station including a locating pin movable from a retracted position to an operative position engaging the pallet to precisely locate it at the station and also including a clamp movable in one direction to an operative position wherein it engages the pallet at the station and firmly clamps it in said precise location and movable in the opposite direction to retract the clamp and disengage the pallet, the combination comprising at least one actuating bar entending lengthwise along said stations and mounted for axial reciprocation, means for shifting said bar axially in opposite directions, a drive member at each said station, said drive member being movable with said bar and also lengthwise of the bar, said drive member being operatively connected with said locating pin and clamp such that the pin and clamp are moved to their operative positions when the drive member is moved in one direction and are moved to their retracted positions when the drive member is moved in the opposite direction, compression spring means acting between said bar and said drive member and biasing said drive member in a direction tending to retract said pin and clamp, means limiting movement of the drive member relative to the bar in said retracting direction whereby when the bar is initially moved in said one direction the locating pin is projected into engagement with the pallet to locate the same and the clamp is brought into clamping engagement with the pallet, and upon further movement of the bar in said one direction said spring means are compressed and cause the drive member to urge said clamp against the pallet with a force proportional to the energy stored in the compressed spring means.

2. The combination called for in claim 1 wherein said drive member is mounted on said bar.

3. The combination called for in claim 1 wherein said drive member comprises a sleeve surrounding said bar.

4. The combination called for in claim 1 wherein said drive member comprises a gear rack and said operative connection between said drive member and said pin and clamp includes gear members.

5. The combination called for in claim 4 wherein said gear rack comprises a sleeve slidably mounted on said bar.

6. The combination called for in claim 2 wherein said spring means comprise a coil spring around said bar, said bar having a pair of axially spaced abutments thereon, one end of said spring engaging one of said abutments, the other end of said spring engaging one end of the drive member, and the other end of the drive member engaging the other abutment on the bar when the pin and clamp are in their retracted positions.

7. The combination called for in claim 6 wherein said spring is in a compressed state when the clamp is in its retracted position so that after the clamp engages the pallet a relatively short further movement of said bar in said one direction is effective to further compress said spring and apply a relatively high clamping force on the pallet.

8. The combination called for in claim 7 wherein at least one of said abutments is adjustable axially of the bar to vary the preload compression on the spring.

9. The combination called for in claim 2 wherein each of said stations includes a base on which said pin and clamp are mounted, said bar extending through each station base, said drive member being disposed within said base and said compression springs means extending between adjacent bases.

10. The combination called for in claim 9 wherein said drive member comprises a sleeve slidably mounted on said bar.

11. The combination called for in claim 10 wherein each base includes a bore in which said sleeve is slidably guided.

12. The combination called for in claim 1 wherein the the means for shifting the bar axially are arranged such that the bar is in tension when actuated to shift the pin and clamp to their operative positions.

13. The combination called for in claim 1 wherein said bar comprises a plurality of sections arranged end to end, means releasably coupling said bar sections between successive stations, said coupling means being threaded for varying the effective length of the bar sections.

14. The combination called for in claiam 13 wherein said coupling means permit relative rotation between longitudinally adjacent bar sections without varying the effective length of the sections.

15. The combination called for in claim 1 wherein each station includes two sets of locating pins, two pairs of clamps and two of said bars spaced apart transversely of the path of travel of the pallets along said stations, said bar shifting means being adapted to shift said two bars simultaneously in opposite directions, each of said bars having one of said drive members and compression spring means associated therewith at each said station and arranged such that when one of said bars is shifted in one direction and the other shifted in the opposite direction each bar is effective to actuate one set of pins and one pair of said clamps to their operative positions.

16. The combination called for in claim 15 including means acting between the clamps in each pair for causing the clamps to apply equal clamping force when actuated to the operative position.

17. The combination called for in claim 15 wherein the means for shifting the two bars comprise a gear rack extending transversely of said bars, pinion means operatively connecting said gear rack with both of said bars and means for reciprocating said gear rack.

18. The combination called for in claim 1 wherein the means for axially shifting said bar are connected to an end of the bar.

19. The combination called for in claim 18 wherein said bar shifting means are connected to the bar such that the bar is in tension when shifted in said one direction to actuate said pin and clamp to their operative positions.

20. The combination called for in claim 1 wherein said means for axially shifting said bar are connected to the opposite ends of said bar.

21. The combination called for in claim 1 wherein said means for axially shifting said bar are operatively connected to the bar intermediate a pair of successive stations.

22. The combination called for in claim 1 including an axially shiftable transfer bar for conveying the pallet supported work pieces to successive stations, abutment means spaced along said transfer bar and adapted when the transfer bar is shifted in one direction, to engage the pallets and advance them to the next successive station, said transfer bar being rotatable about its longitudinal axis to shift said abutment means to a position out of the path of travel of the pallets, such that when the transfer bar is so rotated the abutment means bypass the pallets and means operatively connecting said actuating bar and transfer bar to rotate the transfer bar to a position wherein the abutment means engage the pallet to advance the same when the actuating bar is shifted in a direction to retract the locating pins and clamps and to rotate the transfer bar to a position wherein the abutment means bypass the pallets when the actuating bar is shifted in said one direction to actuate the locating pins and clamps to their operative position.

23. The combination called for in claim 22 wherein said transfer bar has a longitudinally extending track thereon and said means operatively connecting said transfer bar and actuating bar comprise a lever.

24. The combination called for in claim 23 wherein the stroke of the transfer bar is substantially greater than the stroke of the actuating bar.

25. The combination called for in claim 23 wherein said lever comprises a bell crank having a fixed pivot intermediate its ends, one end of the lever being slidably connected with said track, and the other end of said lever being connected with said actuating bar.

* * * * *